United States Patent
Zhao

(10) Patent No.: US 12,099,656 B2
(45) Date of Patent: Sep. 24, 2024

(54) MOTOR CONTROL METHOD, TERMINAL DEVICE, AND NON-TRANSITORY COMPUTER-READABLE STORAGE MEDIUM

(71) Applicant: AAC Acoustic Technologies (Shanghai) Co., Ltd., Shanghai (CN)

(72) Inventor: Guangfei Zhao, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/321,779

(22) Filed: May 23, 2023

(65) Prior Publication Data

US 2024/0168556 A1 May 23, 2024

Related U.S. Application Data

(63) Continuation of application No. PCT/CN2022/144212, filed on Dec. 30, 2022.

(30) Foreign Application Priority Data

Nov. 23, 2022 (CN) .......................... 202211478220.6

(51) Int. Cl.
*G06F 3/04817* (2022.01)
*G06F 3/01* (2006.01)
(Continued)

(52) U.S. Cl.
CPC .......... *G06F 3/016* (2013.01); *G06F 3/04817* (2013.01); *G06F 3/0482* (2013.01); *G06F 3/04847* (2013.01)

(58) Field of Classification Search
CPC ............... G06F 18/2411; G06F 18/214; G06F 2218/12; G06F 18/2135; G06F 2218/08; G06F 18/241; G06F 18/24147; G06F 3/016; G06F 12/0891; G06F 18/22; G06F 18/2414; G06F 30/23; G06F 21/32; G01M 15/00; A61B 5/18; A61B 5/746; A61B 17/1626; A61B 17/1757;
(Continued)

(56) References Cited

U.S. PATENT DOCUMENTS

| | | | |
|---|---|---|---|
| 2008/0204266 A1* | 8/2008 | Malmberg | G06F 3/016 455/418 |
| 2017/0255269 A1* | 9/2017 | Yang | G06F 21/81 |
| 2020/0374381 A1* | 11/2020 | Li | H04M 1/724 |

* cited by examiner

*Primary Examiner* — Rayeez R Chowdhury
(74) *Attorney, Agent, or Firm* — W&G Law Group

(57) ABSTRACT

A motor control method, a terminal device, and a non-transitory computer-readable storage medium are provided. The method includes the following: storing a plurality of groups of motor parameters in advance, where each group of motor parameters include a vibration frequency and a vibration amplitude of a corresponding motor; displaying a plurality of selection buttons on a user interface; obtaining a group of motor parameters corresponding to a triggered selection button as target motor parameters, in response to detecting that any selection button of the plurality of selection buttons is triggered; and driving a motor of the terminal device to vibrate according to the target motor parameters. With aid of the solutions of the disclosure, a plurality of motor vibration effects can be realized on one terminal device, and the switching operation of different vibration effects is simple and convenient, and the switching efficiency is high.

9 Claims, 2 Drawing Sheets

(51) Int. Cl.
*G06F 3/0482* (2013.01)
*G06F 3/04847* (2022.01)

(58) Field of Classification Search
CPC . A61B 2034/2065; A61B 34/20; A61B 34/70; A61B 90/361; G01R 31/34; A61C 17/22; A61C 17/221; A61C 17/34; A61C 17/3445; A61C 17/3481
See application file for complete search history.

MOTOR CONTROL METHOD, TERMINAL DEVICE, AND NON-TRANSITORY COMPUTER-READABLE STORAGE MEDIUM

CROSS REFERENCE TO RELATED APPLICATIONS

The present application is a continuation of PCT Patent Application No. PCT/CN2022/144212, filed Dec. 30, 2022, which claims priority to Chinese patent application No. 202211478220.6, filed Nov. 23, 2022, each of which is incorporated by reference herein in its entirety.

TECHNICAL FIELD

The various embodiments described in this document relate in general to the technical field of motor vibration in a terminal, and more specifically to a motor control method, a terminal device, and a computer storage medium.

BACKGROUND

Existing terminal devices, such as tablet computers and mobile phones, generally have only one kind of motor vibration effect. Therefore, when motor manufacturers need to show customers vibration effect of different motors, they usually need to use multiple terminal devices respectively equipped with different motors to show the vibration effect, which leads to low switching efficiency and poor customer experience during display.

Therefore, it is necessary to provide a motor control method to solve the above technical problems.

SUMMARY

Embodiments of the disclosure aim to provide a motor control method, which can realize a plurality of motor vibration effects on a terminal device, and the switching operation of different vibration effects is simple and convenient, and the switching efficiency is high.

In order to achieve the above object, in a first aspect, the present disclosure provides a motor control method. The method is applied to a terminal device and includes the following: storing a plurality of groups of motor parameters in advance, where each group of motor parameters include a vibration frequency and a vibration amplitude corresponding to a corresponding motor vibration effect of a plurality of motor vibration effects, wherein the plurality of groups of motor parameters and the plurality of motor vibration effects are in one-to-one correspondence; displaying a plurality of selection buttons that are in one-to-one correspondence with the plurality of groups of motor parameters on a user interface; obtaining a group of motor parameters corresponding to any triggered selection button as target motor parameters, in response to detecting that any selection button of the plurality of selection buttons is triggered; and driving a motor of the terminal device to vibrate according to the target motor parameters.

In some embodiments, driving the motor of the terminal device to vibrate according to the target motor parameters includes: generating a vibration waveform curve according to the vibration frequency and the vibration amplitude corresponding to the target motor parameters; and driving the motor of the terminal device to vibrate according to the vibration waveform curve.

In some embodiments, each group of motor parameters further include a vibration duration, and the method further includes: after driving the motor of the terminal device to vibrate according to the target motor parameters, controlling the motor to stop vibrating, in response to detecting that another selection button of the plurality of selection buttons is triggered within a vibration duration corresponding to the target motor parameters; and continuing to obtain another group of motor parameters corresponding to the triggered another selection button as the target motor parameters.

In some embodiments, a respective section button includes a selection box and a name of a motor type, wherein in response to a selection box being selected, a selection button corresponding to the selected selection box is triggered.

In some embodiments, in a second aspect, a terminal device is provided. The terminal device includes a storage module, a display module, an obtaining module, and a driving module. The storage module is configured to store a plurality of groups of motor parameters in advance, where each group of motor parameters includes a vibration frequency and vibration amplitude of a motor. The display module is configured to display a plurality of selection buttons being in one-to-one correspondence with the plurality of groups of motor parameters on a user interface. The obtaining module is configured to obtain a group of motor parameters corresponding to any triggered selection button of the plurality of selection buttons as target motor parameters in response to detecting that any selection button is triggered. The driving module is configured to drive the motor of the terminal device to vibrate according to the target motor parameters.

In some embodiments, the driving module is configured to: generate a vibration waveform curve according to the vibration frequency and the vibration amplitude corresponding to the target motor parameters; and drive the motor of the terminal device to vibrate according to the vibration waveform curve.

In some embodiments, each group of motor parameters further include a vibration duration. The obtaining module is further configured to detect that another selection button of the plurality of selection buttons is triggered; the driving module is further configured to control the motor to stop vibrating, in response to a vibration duration corresponding to the target motor parameters being not ended; and the obtaining module is further configured to obtain another group of motor parameters corresponding to the triggered another selection button as the target motor parameters.

In some embodiments, a respective section button includes a selection box and a name of a motor type, wherein in response to a selection box being selected, a selection button corresponding to the selected selection box is triggered.

In some embodiments, a terminal device is provided. The terminal device includes a processor and a memory storing a computer program. The computer program, when executed by the processor, cause the processor to perform the method described in any embodiment of the disclosure.

In some embodiments, a non-transitory computer-readable storage medium, the computer-readable storage medium storing a computer program, and the computer program, when executed by a processor, causes the processor to perform the method described in any aspect of the disclosure.

Compared with the related technologies, the motor control method provided in the disclosure includes the following: storing a plurality of groups of motor parameters in advance, where each group of motor parameters include a vibration frequency and a vibration amplitude of a corresponding motor; displaying a plurality of selection buttons that are in one-to-one correspondence with the plurality of groups of motor parameters on a user interface; obtaining a group of motor parameters corresponding to any triggered selection button of the plurality of selection buttons as target motor parameters, in response to detecting that the any selection button is triggered; and driving a motor of the terminal device to vibrate according to the target motor parameters. With aid of the solutions of the disclosure, a plurality of motor vibration effects can be realized on one terminal device, and the switching operation of different vibration effects is simple and convenient, and the switching efficiency is high.

BRIEF DESCRIPTION OF THE DRAWINGS

In order to explain technical aspects of the embodiments of the present disclosure more clearly, the drawings required for use in the description of the embodiments will be briefly described below. It will be apparent that the drawings described below are only some embodiments of the disclosure, and other drawings may be obtained from these drawings without any creative effort by those of ordinary skill in the art.

DETAILED DESCRIPTION OF THE EMBODIMENTS

A clear and complete description of the technical aspects of the embodiments of the disclosure will be given below in conjunction with the accompanying drawings in the embodiments of the disclosure, and it will be apparent that the described embodiments are only part of the embodiments of the disclosure, not all the embodiments of the disclosure. Based on the embodiments in the disclosure, all other embodiments obtained without creative effort by those of ordinary skill in the art fall within the scope of protection of the present disclosure.

Figure 1:
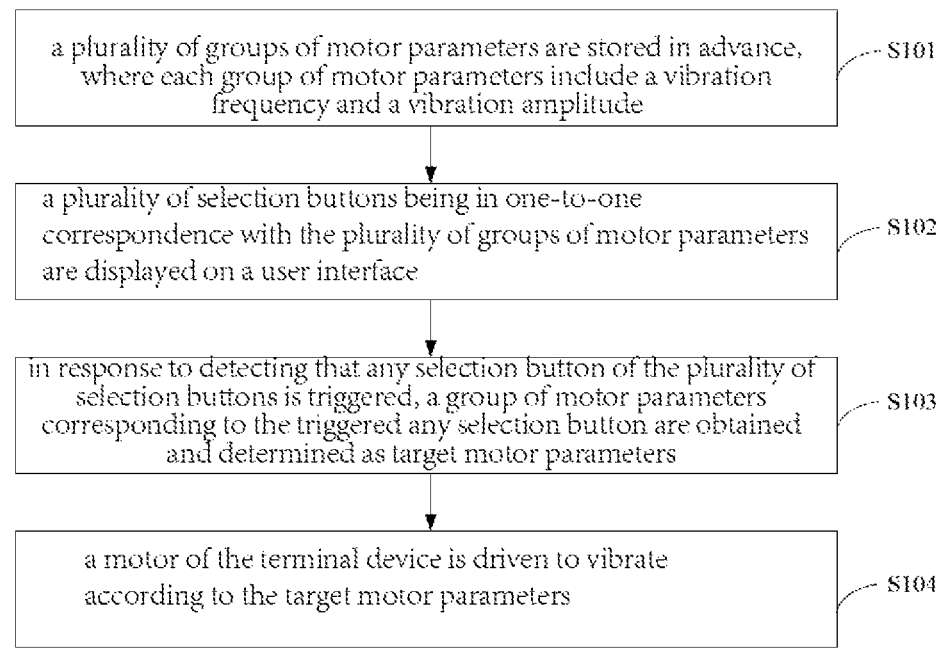
FIG. 1 is a flow chart of a motor control method applied in a terminal device according to an embodiment of the present disclosure.

Referring to FIG. 1, a motor control method provided in the embodiment of the disclosure is applicable to a terminal device and include following operations.

At S101, a plurality of groups of motor parameters are stored in advance, where each group of motor parameters include a vibration frequency and a vibration amplitude corresponding to a corresponding motor vibration effect of a plurality of motor vibration effects, wherein the plurality of groups of motor parameters and the plurality of motor vibration effects are in one-to-one correspondence.

The terminal device can be, for example, a mobile phone, a tablet personal computer, and the like. Taking the mobile phone as an example, the stored plurality of groups of motor parameters can include motor parameters of mobile phones of different brands and motor parameters of mobile phones of a same brand and of different models, so that the vibration effect of mobile phones of different brands can be simulated on a same terminal device.

At S102, a plurality of selection buttons being in one-to-one correspondence with the plurality of groups of motor parameters are displayed on a user interface.

By establishing a one-to-one correspondence relationship between the plurality of groups of motor parameters and the plurality of selection buttons on the user interface, the plurality of groups of motor parameters and the plurality of selection buttons are in one-to-one correspondence.

Figure 2:
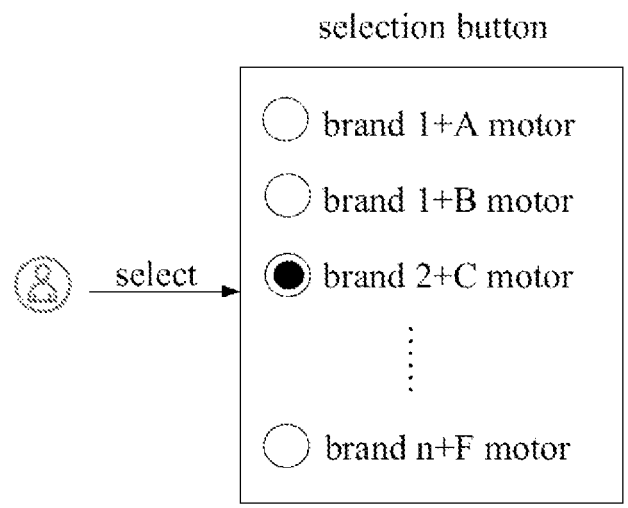
FIG. 2 is a schematic diagram of a user interface according to an embodiment of the present disclosure.

In one implementation, each selection button may include a selection box and a motor type name, where the selection box is for a user to perform a selection operation. For example, in the user interface shown in FIG. 2, motor type names of the selection buttons displayed on the user interface include mobile phone brand 1-A-type motor, mobile phone brand 1-B-type motor, mobile phone brand 2-C-type motor, . . . , mobile phone brand n-F-type motor, and the like. In addition, there is a selection box in the front of each motor type name for the user to select.

At S103, in response to detecting that any selection button of the plurality of selection buttons is triggered, a group of motor parameters corresponding to the triggered any selection button are obtained and determined as target motor parameters.

When a selection box of any selection button is selected, the selection button corresponding to the any selected selection box is triggered.

At S104, a motor of the terminal device is driven to vibrate according to the target motor parameters.

For example, a vibration frequency of an original motor is lowered or raised according to the target motor parameters, and a vibration amplitude of the original motor is changed, so that the vibration frequency and vibration amplitude of the motor are the vibration frequency and vibration amplitude of the target motor parameters, thereby achieving the corresponding motor vibration effect.

Alternatively, in other implementations, driving the motor of the terminal device to vibrate according to the target motor parameters may include: generating a vibration waveform curve according to the vibration frequency and the vibration amplitude corresponding to the target motor parameters; and driving the motor of the terminal device to vibrate according to the vibration waveform curve.

Furthermore, each group of motor parameters further include a vibration duration. After driving the motor of the terminal device to vibrate according to the target motor parameters, the method further includes: when another selection button of the plurality of selection buttons is detected to be triggered, if the vibration duration corresponding to the target motor parameters is not ended, the motor is controlled to stop vibrating, and the method proceeds to obtaining the group of motor parameters corresponding to the triggered selection button as the target motor parameters.

Therefore, in the motor control method of the embodiment of the disclosure, a customized interface is provided for a user through a user interface, and when different motor vibration effects need to be experienced, a corresponding selection button is only selected in the user interface where the customized interface is located, thereby realizing a plurality of motor vibration effects on a terminal device. Therefore, the switching operation of different vibration effects is simple and convenient, the switching efficiency is high, and the user experience is improved.

Figure 3:
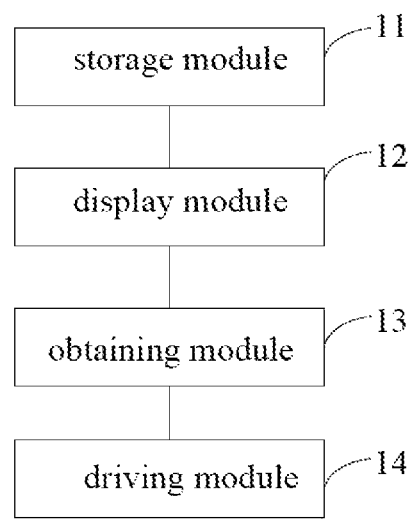
FIG. 3 is a schematic structural diagram of the terminal device according to an embodiment of the present disclosure.

Referring to FIG. 3, an embodiment of the present disclosure provides a terminal device 100. The terminal device 100 includes a storage module 11, a display module 12, an obtaining module 13, and a driving module 14.

The storage module 11 is configured to store a plurality of groups of motor parameters in advance, where each group of motor parameters includes a vibration frequency and vibration amplitude of a motor. The stored plurality of groups of motor parameters may include motor parameters of mobile phones of different brands and motor parameters of mobile phones of a same brand and of different models, so that the vibration effect of mobile phones of different brands can be simulated on a same terminal device.

The display module 12 is configured to display a plurality of selection buttons being in one-to-one correspondence with the plurality of groups of motor parameters on a user interface. Each selection button may include a selection box and a motor type name, where the selection box is for a user to perform a selection operation.

The obtaining module 13 is configured to obtain a group of motor parameters corresponding to any triggered selection button of the selection buttons as target motor parameters when it is detected that the any selection button is triggered. When a selection box of the selection button is selected, the selection button corresponding to the selected selection box is triggered.

The driving module 14 is configured to drive the motor of the terminal device to vibrate according to the target motor parameters. For example, a vibration frequency of an original motor is lowered or raised according to the target motor parameters, and a vibration amplitude of the original motor is changed, so that the vibration frequency and vibration amplitude of the motor are the vibration frequency and vibration amplitude of the target motor parameters, thereby achieving the corresponding motor vibration effect.

Furthermore, each group of motor parameters further include a vibration duration. When the obtaining module 13 detects that another selection button of the plurality of selection buttons is triggered within the vibration duration corresponding to the target motor parameters, the driving module 14 is further configured to control the motor to stop vibrating and continues to obtain another group of motor parameters corresponding to the triggered another selection button as the target motor parameters.

Therefore, according to the terminal device provided in the disclosure, when different motor vibration effects need to be experienced, only the corresponding selection button needs to be selected in the user interface, so that a plurality of motor vibration effects can be realized on one terminal device, and the switching operation of different vibration effects is simple and convenient, the switching efficiency is high, and the user experience is improved.

Embodiments of the disclosure further provide a terminal device. The terminal device includes a processor and a memory storing a computer program. The computer program, when executed by the processor, cause the processor to perform the method described in any embodiment of the disclosure.

Embodiments of the disclosure further provide a non-transitory computer-readable storage medium on which a computer program is stored. The computer program, when executed by a processor, cause the processor to achieve the motor control method described in any of the above embodiments.

Compared with the related technologies, in the motor control method of the disclosure, the plurality of groups of motor parameters are stored in advance, where each group of motor parameters include a vibration frequency and a vibration amplitude of the motor. Selection buttons being in one-to-one corresponding with the plurality of groups of motor parameters are displayed in the user interface. When any selection button of the selection buttons is detected to be triggered, a group of motor parameters corresponding to the any triggered selection button is obtained as target motor parameters. According to the target motor parameters, the motor of the terminal device is driven to vibrate, so that when different motor vibration effects need to be experienced, only corresponding selection buttons need to be selected in the user interface. Therefore, with aid of the solutions of the disclosure, it is possible to realize a plurality of motor vibration effects on one terminal device. In addition, the switching operation of different vibration effects is simple and convenient, the switching efficiency is high, and the user experience is improved.

The foregoing is only an embodiment of the present disclosure, and it shall be noted that improvements may be made to those of ordinary skill in the art without departing from the idea of the present disclosure, but these are within the scope of protection of the present disclosure.

What is claimed is:

1. A motor control method, being applicable to a terminal device and comprising:
storing a plurality of groups of motor parameters in advance, wherein each group of motor parameters include a vibration frequency and a vibration amplitude corresponding to a corresponding motor vibration effect of a plurality of motor vibration effects, wherein the plurality of groups of motor parameters and the plurality of motor vibration effects are in one-to-one correspondence;
displaying a plurality of selection buttons that are in one-to-one correspondence with the plurality of groups of motor parameters on a user interface;
obtaining a group of motor parameters corresponding to a triggered selection button of the plurality of selection buttons as target motor parameters, in response to detecting that the selection button is triggered; and
driving a motor of the terminal device to vibrate according to the target motor parameters;
wherein a respective selection button includes a selection box and a motor type name, wherein in response to a selection box being selected, a selection button corresponding to the selected selection box is triggered.

2. The method of claim 1, wherein driving the motor of the terminal device to vibrate according to the target motor parameters comprises:
generating a vibration waveform curve according to the vibration frequency and the vibration amplitude corresponding to the target motor parameters; and
driving the motor of the terminal device to vibrate according to the vibration waveform curve.

3. The method of claim 1, wherein each group of motor parameters further include a vibration duration, and the method further includes:
after driving the motor of the terminal device to vibrate according to the target motor parameters,
controlling the motor to stop vibrating, in response to detecting that another selection button of the plurality of selection buttons is triggered within a vibration duration corresponding to the target motor parameters; and
obtaining another group of motor parameters corresponding to the triggered another selection button as the target motor parameters.

4. A terminal device, comprising:
a processor; and a memory coupled with the processor and storing a computer program, wherein the computer program, when executed by the processor, cause the processor to:

store a plurality of groups of motor parameters in advance, wherein each group of motor parameters includes a vibration frequency and vibration amplitude of corresponding to a corresponding motor vibration effect of a plurality of motor vibration effects, wherein the plurality of groups of motor parameters and the plurality of motor vibration effects are in one-to-one correspondence;

display a plurality of selection buttons being in one-to-one correspondence with the plurality of groups of motor parameters on a user interface;

obtain a group of motor parameters corresponding to a triggered selection button of the selection buttons as target motor parameters in response to detecting that the selection button is triggered; and drive the motor of the terminal device to vibrate according to the target motor parameters;

wherein a respective selection button includes a selection box and a name of a motor type, wherein in response to a selection box being selected, a selection button corresponding to the selected selection box is triggered.

5. The terminal device of claim 4, wherein the processor configured to drive the motor of the terminal device to vibrate according to the target motor parameters is configured to:

generate a vibration waveform curve according to the vibration frequency and the vibration amplitude corresponding to the target motor parameters; and drive the motor of the terminal device to vibrate according to the vibration waveform curve.

6. The terminal device of claim 4, wherein each group of motor parameters further include a vibration duration, and wherein the computer program, when executed by the processor, further cause the processor to:

detect that another selection button of the plurality of selection buttons is triggered;

control the motor to stop vibrating, in response to a vibration duration corresponding to the target motor parameters being not ended; and obtain another group of motor parameters corresponding to the triggered another selection button as the target motor parameters.

7. A non-transitory computer-readable storage medium, the computer-readable storage medium storing a computer program, and the computer program, when executed by a processor, causes the processor to perform:

storing a plurality of groups of motor parameters in advance, wherein each group of motor parameters include a vibration frequency and a vibration amplitude corresponding to a corresponding motor vibration effect of a plurality of motor vibration effects, wherein the plurality of groups of motor parameters and the plurality of motor vibration effects are in one-to-one correspondence;

displaying a plurality of selection buttons that are in one-to-one correspondence with the plurality of groups of motor parameters on a user interface;

obtaining a group of motor parameters corresponding to a triggered selection button of the plurality of selection buttons as target motor parameters, in response to detecting that the selection button is triggered; and driving a motor of the terminal device to vibrate according to the target motor parameters;

wherein a respective selection button includes a selection box and a motor type name, wherein in response to a selection box being selected, a selection button corresponding to the selected selection box is triggered.

8. The non-transitory computer-readable storage medium of claim 7, wherein the computer program, when executed by a processor, causing the processor to perform driving the motor of the terminal device to vibrate according to the target motor parameters cause the processor to perform:

generating a vibration waveform curve according to the vibration frequency and the vibration amplitude corresponding to the target motor parameters; and driving the motor of the terminal device to vibrate according to the vibration waveform curve.

9. The non-transitory computer-readable storage medium of claim 7, wherein each group of motor parameters further include a vibration duration, and the computer program, when executed by a processor, further causes the processor to perform:

after driving the motor of the terminal device to vibrate according to the target motor parameters,
controlling the motor to stop vibrating, in response to detecting that another selection button of the plurality of selection buttons is triggered within a vibration duration corresponding to the target motor parameters; and
obtaining another group of motor parameters corresponding to the triggered another selection button as the target motor parameters.

* * * * *